United States Patent
Toyama et al.

(10) Patent No.: US 9,977,664 B2
(45) Date of Patent: May 22, 2018

(54) INFORMATION PROCESSING DEVICE AND INFORMATION PROCESSING METHOD IN HETEROGENOUS MULTI-CORES HAVING DIFFERENT ARCHITECTURES

(71) Applicant: Renesas Electronics Corporation, Kawasaki-shi, Kanagawa (JP)

(72) Inventors: Masakatsu Toyama, Tokyo (JP); Masanori Hayashikoshi, Kanagawa (JP)

(73) Assignee: Renesas Electronics Corporation, Koutou-ku, Tokyo (JP)

( * ) Notice: Subject to any disclaimer, the term of this patent is extended or adjusted under 35 U.S.C. 154(b) by 584 days.

(21) Appl. No.: 14/243,486

(22) Filed: Apr. 2, 2014

(65) Prior Publication Data
US 2014/0304490 A1    Oct. 9, 2014

(30) Foreign Application Priority Data
Apr. 3, 2013  (JP) .................................. 2013-077455

(51) Int. Cl.
*G06F 9/38*    (2018.01)
*G06F 1/32*    (2006.01)
*G06F 9/45*    (2006.01)

(52) U.S. Cl.
CPC ............ *G06F 8/451* (2013.01); *G06F 1/3293* (2013.01); *G06F 9/3877* (2013.01)

(58) Field of Classification Search
CPC ..... G06F 1/3287; G06F 1/3293; G06F 9/3877
See application file for complete search history.

(56) References Cited

U.S. PATENT DOCUMENTS 7,149,878 B1 * 12/2006 Jensen ................ G06F 9/30076
                                                         712/209
7,634,615 B2    12/2009 Sutardja
(Continued)

FOREIGN PATENT DOCUMENTS

| CN | 1321270 A | 11/2001 |
|----|-----------|---------|
| JP | 2010-108213 A | 5/2010 |
| JP | 2010-538371 A | 12/2010 |

OTHER PUBLICATIONS

Miao Zhang, Dexian Zhang. "A Heterogeneous Multi-core Architecture with Stability and High Performance" 2010 International Conference on Computer Application and System Modeling (ICCASM 2010).*

(Continued)

*Primary Examiner* — Jacob A Petranek
(74) *Attorney, Agent, or Firm* — Sughrue Mion, PLLC

(57) ABSTRACT

An application process is switched between asymmetric processor cores having no compatibility in instruction set architectures so that the process can be continuously executed. In an information processing device, when a request to switch an execution subject is generated while a first processor core is executing an application program, a switch process code makes the first processor core specify a basic block being executed at present. The switch process code makes the first processor core execute a first execution code until a branch instruction at the end of the specified basic block, and makes a second processor core execute a second execution code from an instruction at the head of a basic block to be executed next to the specified basic block.

9 Claims, 12 Drawing Sheets

(56) References Cited

U.S. PATENT DOCUMENTS

| | | | |
|---|---|---|---|
| 2012/0233477 A1* | 9/2012 | Wu | G06F 1/3287 713/320 |
| 2013/0061237 A1* | 3/2013 | Zaarur | G06F 9/4856 718/105 |
| 2014/0026146 A1* | 1/2014 | Jahagirdar | G06F 9/4856 718/105 |
| 2014/0173623 A1* | 6/2014 | Chang | G06F 9/5088 718/105 |
| 2014/0181830 A1* | 6/2014 | Naik | G06F 9/461 718/104 |
| 2014/0189333 A1* | 7/2014 | Ben-Kiki | G06F 9/3861 712/244 |
| 2014/0325184 A1* | 10/2014 | Rotem | G06F 9/30083 712/42 |

OTHER PUBLICATIONS

Peter Greenhalgh, "Big.Little Processing with ARM CortexTM-A15 & Cortex-A7", ARM, Whitepaper, Sep. 2011, pp. 1-8.

Japanese Office Action related to Japanese Application No. 2013-077455 dated Oct. 5, 2016.

Communication dated May 30, 2017, issued from the Japanese Patent Office in corresponding Japanese Patent Application No. 2013-077455.

Communication dated Jun. 5, 2017, from the State Intellectual Property Office of People's Republic of China in counterpart Application No. 201410131614.3.

\* cited by examiner

FIG. 5

INSTRUCTION ADDRESS CONVERSION TABLE

|  | CORE 1 | CORE 2 |
|---|---|---|
| BASIC BLOCK A | 0x1000 | 0x8000 |
| BASIC BLOCK B | 0x103C | 0x8050 |
| BASIC BLOCK C | 0x10A4 | 0x8118 |

FIG. 6

```
SAMPLE CODE void func_main(void) {
    PROCESS 1
    func_a(4, 8);
    PROCESS 2
} void func_a(int a, int b) {
    PROCESS 3
}
```

INFORMATION PROCESSING DEVICE AND INFORMATION PROCESSING METHOD IN HETEROGENOUS MULTI-CORES HAVING DIFFERENT ARCHITECTURES

CROSS-REFERENCE TO RELATED APPLICATIONS

The disclosure of Japanese Patent Application No. 2013-077455 filed on Apr. 3, 2013 including the specification, drawings and abstract is incorporated herein by reference in its entirety.

BACKGROUND

The present invention relates to an information processing device and an information processing method and, for example, is preferably used in a central processing unit (CPU) having heterogeneous (asymmetric) multi-cores whose architectures are different from each other.

A device driven on a battery such as a sensor device is required to operate for a long period after being installed without replacing a battery. In such a device, usually, data collection of a sensor is performed by an intermittent operation, and a calculating process using stored data or a data transfer using a network is performed at a certain timing. Since the computing power of the CPU is unnecessary in normal times in which a simple data collecting process is intermittently performed, the CPU may operate at an operation frequency as low as possible so as not to consume power. On the other hand, at the time of performing analysis of a large amount of data or a network process, the process has to be completed in short time at high CPU capability.

To such a request, a technique generally called DVFS (Dynamic Voltage and Frequency Scaling) of changing the operation frequency and voltage of a CPU core in accordance with necessary computing power is used. However, in the architecture of a single CPU core, it is difficult to obtain a characteristic satisfying both low-power consumption and high performance.

ARM Holdings plc (ARM) attempts to solve the problem by big.LITTLE processing architecture which combines a CPU core having a low-power-oriented characteristic and a high-performance CPU core and seamlessly switches software between the cores (refer to Peter Greenhalgh, "Big. LITTLE processing with ARM Cortex™-A15 & Cortex-A7", ARM, WHITEPAPER, September 2011 (non-patent literature 1)).

A method equivalent to the big.LITTLE architecture of ARM is described in Japanese Unexamined Patent Application Publication (translation of PCT Application) No. 2010-538371 (patent literature 1). The literature discloses a method of transparently switching an application from the OS (Operating System) between two asymmetric cores having characteristics of different operation frequencies and operation power levels. In the configuration of the patent literature, instruction set architectures (ISA) of two asymmetric cores have to have compatibility.

BACKGROUND ART LITERATURE

Patent Literature

Patent Literature 1: Japanese Unexamined Patent Application Publication (translation of PCT Application) No. 2010-538371

Non-Patent Literature

[Non-Patent Literature 1]
Peter Greenhalgh, "Big. LITTLE processing with ARM Cortex™-A15 & Cortex-A7", ARM, WHITEPAPER, September 2011

SUMMARY

Although Japanese Unexamined Patent Application Publication (translation of PCT Application) No. 2010-538371 (patent literature 1) discloses a method of switching the application process between the cores and continuously executing it, the precondition is that the ISAs have compatibility. That is, although a difference in the micro-architecture level of an instruction pipeline, a super scalar, or the like is allowed, the kind of an executable instruction and a set of general registers have to be common. Consequently, the difference in performance or the difference of power efficiency between cores of different characteristics is limited to the degree of several times. Similarly, also in the case of the whitepaper of ARM (non-patent literature 1), it is described that the difference in performance between Cortex-A7 and Cortex-A15 is three times at the maximum, and the difference of power efficiency is about 3.8 times at the maximum.

A main object of the present invention is to provide an information processing device and an information processing method capable of continuously executing an application process while switching the process between asymmetric cores whose ISAs have no compatibility.

An information processing device as an embodiment includes a first processor core, a second processor core, and a memory coupled to the first and second processor cores. The memory stores a first execution code, a second execution code, a table, and a switch process code. The first and second execution codes are obtained by compiling an application program for execution in each of the first and second processor cores, respectively. The table shows a corresponding relation between an address of each of basic blocks of the first execution code on the memory and an address of each of basic blocks of the second execution code on the memory. When a request of switching an execution subject is generated during a period in which the first processor core executes the application program, the switch process code makes the first processor core specify a basic block which is being executed at present on the basis of the table. The switch process code makes the first processor core execute the first execution code until a branch instruction at the end of the specified basic block, and makes the second processor core execute the second execution code from an instruction at the head of a basic block to be executed next to the specified basic block.

According to the embodiment, by switching the application process between the asymmetric cores whose ISAs have no compatibility, the application process can be continuously executed.

BRIEF DESCRIPTION OF THE DRAWINGS

FIG. 5 is a diagram for explaining address information recorded in an instruction address conversion table in the example of FIG. 4.

FIG. 6 is a diagram illustrating a sample code.

DETAILED DESCRIPTION

Figure 1:
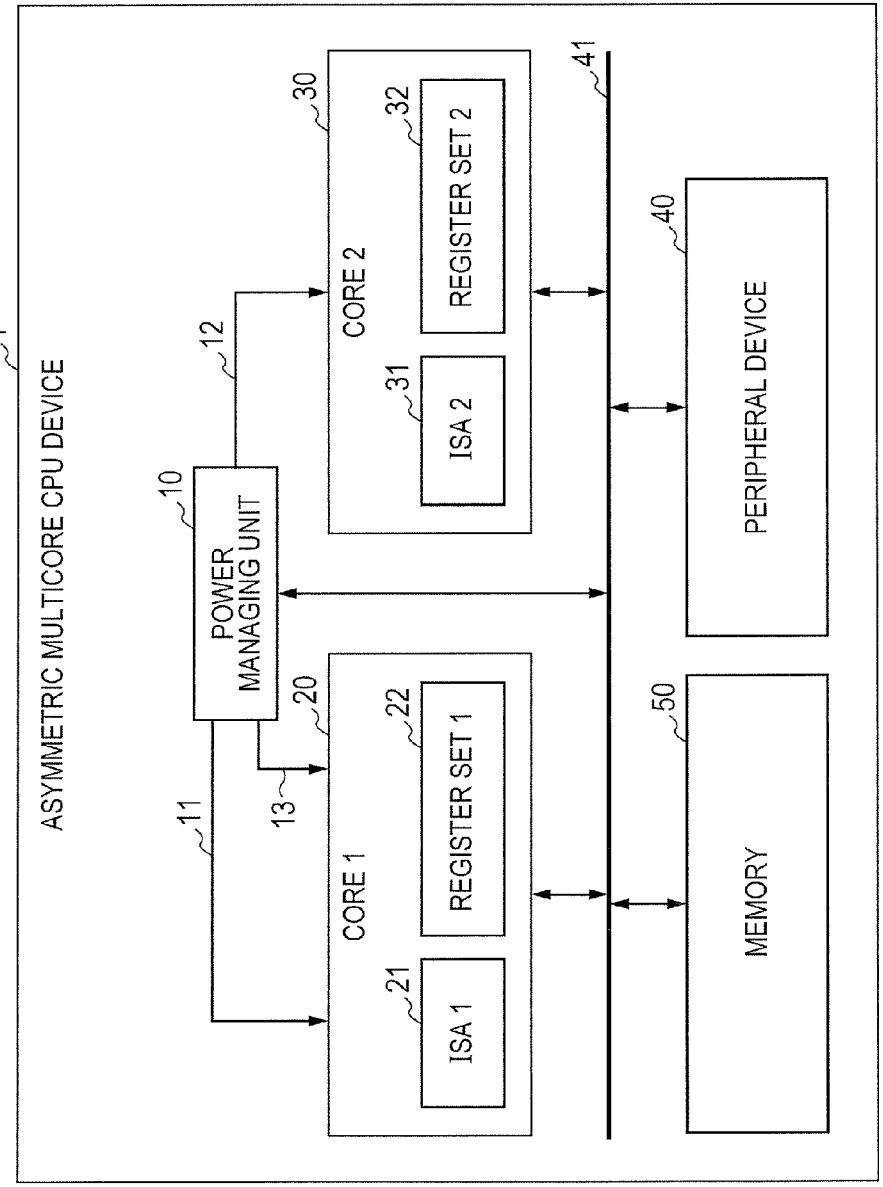
FIG. 1 is a block diagram illustrating the configuration of an asymmetric multicore CPU device as an information processing device according to an embodiment.

Hereinafter, an embodiment will be described specifically with reference to the drawings. The same reference numerals are designated to the same or corresponding parts and their description will not be repeated.

General Configuration of Asymmetric Multicore CPU Device

FIG. 1 is a block diagram illustrating the configuration of an asymmetric multicore CPU device as an information processing device according to an embodiment.

With reference to FIG. 1, an asymmetric multicore CPU device 1 includes a low-power-oriented core 1 (20), a high-performance-oriented core 2 (30), and a power managing unit 10. The core 1 (20) operates at lower operation frequency and operates at lower operation voltage as compared with the core 2 (30), so that the power consumption is low.

An instruction set architecture (ISA1) (21) mounted in the core 1 (20) and an instruction set architecture (ISA2) (22) mounted in the core 2 (30) do not have to have compatibility. Further, a register set 1 (22) provided in the core 1 (20) and a register set 2 (32) provided in the core 2 (30) do not have to have compatibility.

For example, the register width of the low-power-oriented core 1 (20) may be set to 16 bits, and that of the high-performance-oriented core 2 (30) may be set to 32 bits. By making the register width of the core 1 (20) smaller than that of the core 2 (30), the circuit area and the number of registers in the core 1 (20) can be reduced. Therefore, the performance difference or power efficiency difference between the core 1 (20) and the core 2 (30) can be increased.

The power managing unit 10 supplies power (power supply voltage) via a power supply line 11 to the core 1 (20) and supplies power (power supply voltage) via a power supply line 12 to the core 2 (30). The power supplies to the cores are independently controlled by the power managing unit 10. The power managing unit 10 can issue an interrupt notification to the core 1 (20) via an interrupt signal line 13.

The asymmetric multicore CPU device 1 further includes a memory 50, a peripheral device 40, and a bus 41. The core 1 (20), the core 2 (30), the power managing unit 10, the memory 50, and the peripheral device 40 are coupled to one another via the bus 41. The core 1 (20) and the core 2 (30) are being coupled to the memory 50 and the peripheral device 40 via the bus 41 to share the memory 50 and the peripheral device 40.

Configuration of Software on Memory

Figure 2:
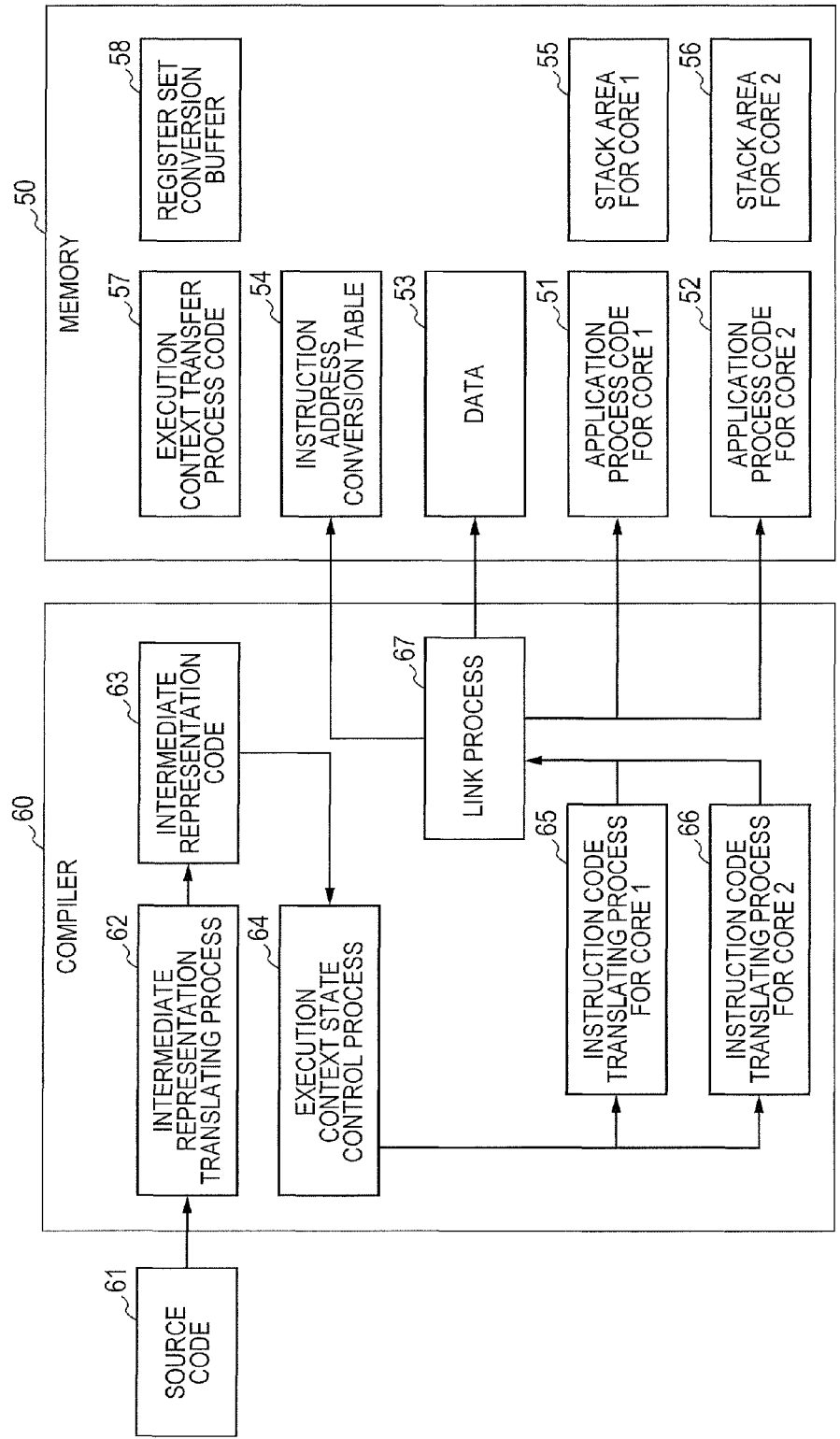
FIG. 2 is a diagram illustrating the configuration of software stored in a memory in FIG. 1.

FIG. 2 is a diagram illustrating the configuration of software stored in a memory in FIG. 1. FIG. 2 also illustrates a process of converting a source code 61 to an execution code for the core 1 (20) and an execution code for the core 2 (30) (hereinbelow, also called instruction codes or process codes) by a compiler 60.

With reference to FIGS. 1 and 2, the source code 61 in which an application process is described is converted by the complier 60 to an application process code 51 for the core 1 translated to an instruction code of the core 1 (20), an application process code 52 for the core 2 translated to an instruction code of the core 2 (30), and data 53 commonly referred to from the process codes 51 and 52. An instruction address conversion table 54 illustrating the correspondence relation of addresses of the application process code 51 for the core 1 and the application process code 52 for the core 2 is also generated. The software 51 to 54 is placed on the memory 50 at the time of execution.

In addition, on the memory 50, a stack area 55 for the core 1 used at the time of executing the application process code 51 for the core 1 in the core 1 (20) and a stack area 56 for the core 2 used at the time of executing the application process code 52 for the core 2 in the core 2 (30) are assured. On the memory 50, further, an execution context transfer process code 57 having a working necessary to transfer an execution state of the core 1 (20) to the core 2 (30) and to continuous execution and a register set conversion buffer 58 for temporarily storing data in the register set 1 (22) as an execution state of the core 1 (20) are placed.

Compiling Process

1. Lexical Analysis

Figure 3:
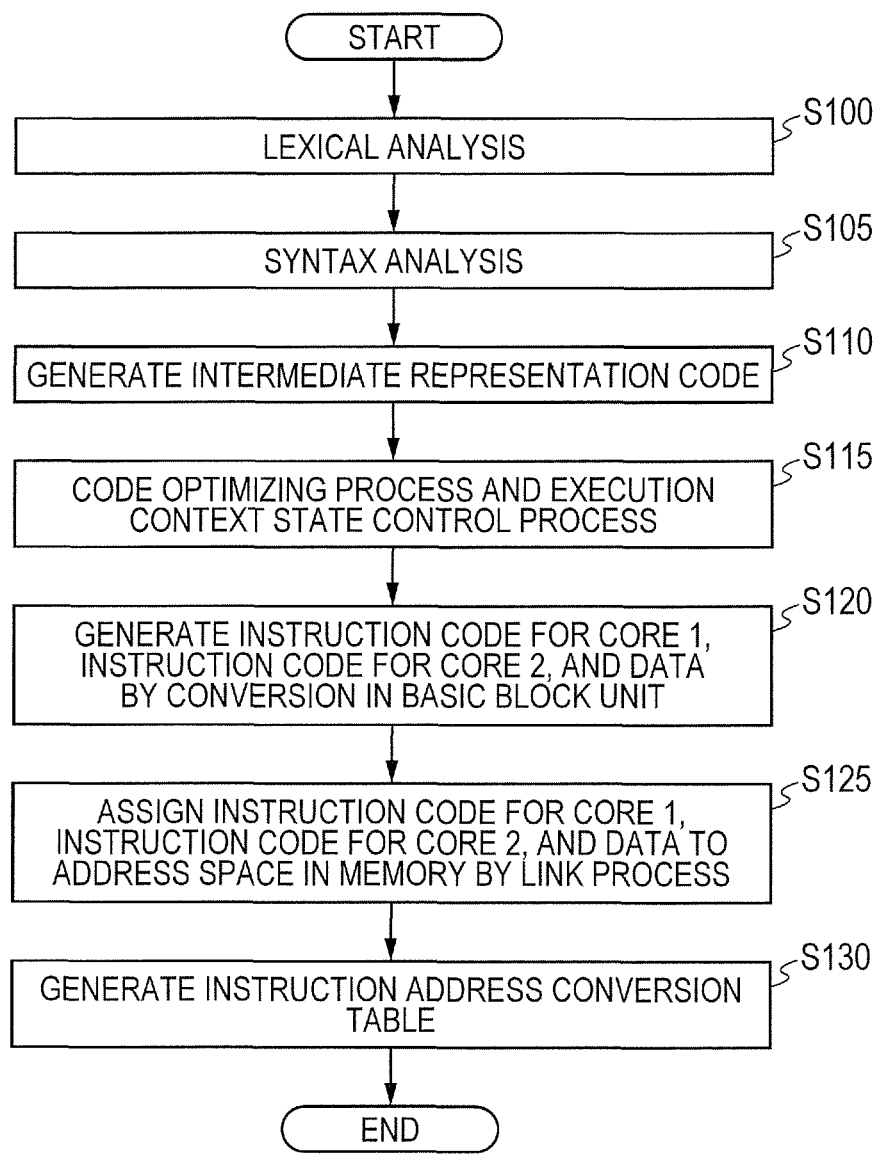
FIG. 3 is a flowchart illustrating the procedure of compiling process.

FIG. 3 is a flowchart illustrating the procedure of compiling process. With reference to FIGS. 2 and 3, in the compiling process, first, a lexical analysis process (step S100) of converting the source code 61 to a string of tokens as a grammatical basic unit is executed.

2. Syntax Analysis and Intermediate Representation Translation Process

Next, a syntax analysis process (step S105) of analyzing the token string in accordance with a grammatical rule of a programming language is performed and, subsequently, an intermediate representation translating process 62 of generating an intermediate representation code 63 on the basis of a syntax analysis result is performed (step S110). In such a manner, the source code 61 in which the application process is described is temporarily converted to the intermediate representation code 63 as an instruction code which does not depend on a specific ISA by the intermediate representation translating process 62 at the time of converting the code to the process codes 51 and 52 for the cores.

The intermediate representation code 63 is obtained by explicitly embodying intermediate data expressing the logical structure of software as a result of performing the lexical analysis and the syntax analysis by the compiler 60. A general compiler internally holds intermediate data corresponding to an intermediate representation code although it does not explicitly output data in the form of an intermediate representation code. An intermediate representation code is, for example, of an instruction form which does not depend on the ISA such as a bytecode of Java (registered trademark)

and is a versatile instruction code scheme such as load, store, arithmetic operation, and branch. A method of translating a code temporarily to an intermediate representation code, performing optimization and, after that, converting the code to a target instruction code in a compiler is a known technique used in an LLVM (Low Level Virtual Machine) or the like of the compiler base.

Generally, a program can be divided into some basic blocks using a branch instruction (jump instruction) as a marker. The basic block is defined that (i) an execution control progresses from the beginning to the last of an arrangement of sentences configuring a basic block, (ii) a branch instruction (jump instruction) is placed only at the end of a basic block, and (iii) a process can enter from the beginning of a basic block from another basic block. The following steps are executed using the basic block as a unit.

3. Code Optimizing Process/Execution Context State Control Process

Next, the compiler 60 executes a code optimizing process and execution context state control process 64 (step S115). The code optimizing process is a process peculiar to the architecture of each of cores executed on the intermediate representation code 63 in order to generate a code of higher efficiency. For example, a process of assigning a variable or a temporal during-calculation result to a specific general register or the like is performed.

The execution context state control process 64 is performed to put a limit on the code optimizing process. In the embodiment, when the process is switched from the core 1 to the core 2 at the time of executing the application program, processes until a branch instruction at the end of a basic block being presently executed by the core 1 are executed, and the process is handed over from the core 1 to the core 2 at the border of the basic blocks. At this time, the head position of the following basic block is used as a check point, and the register state and the stack state (so-called execution context) of the core 1 are converted to those for the core 2. To enable the execution context converting process, the following limits are put in the code optimizing process.

Limit 1

At the border of basic blocks, the content and the order of data saved in the stack area 55 for the core 1 (20) and those of data saved in the stack area 56 for the core 2 (30) are matched. The units (register widths) of the data saved in the stack areas do not have to be matched.

Limit 2

At the border of basic blocks, the contents of data held in general registers having a common use purse in the cores in the register set 1 (22) for the core 1 and the register set 2 (32) for the core 2 (30) are matched. In internal processes of the basic blocks, general registers may be freely used for code optimization.

Limit 3

In the case of saving address information (for example, a program counter (PC)) of an instruction code in a stack area, the address information is saved so that it can be distinguished from the other data saved in the stack. The limit 3 is necessary to enable a process of rewriting address information in accordance with the instruction address conversion table 54 to be easily executed at the time of handing the process from the core 1 to the core 2.

With respect to the limits 1 and 2, for example, the temporal during-calculation result used in the basic blocks can be passed to the next basic block while being held in a register in a processor core having sufficient number of general registers. On the other hand, in a processor core having limited number of general registers, temporal data is saved in a stack and is taken out in the next basic block or temporarily discarded and calculation has to be performed again in the next basic block to regenerate data. To absorb the difference in the processes caused by the difference in the architectures of the processor cores at a check point (the border of basic blocks), in the execution context state control process 64, an additional process for making states of registers and stacks (execution contexts) match is performed. For example, in the case where data is stored in a general register in one of cores and is stored in a stack in the another core, a process of temporarily saving the former data into a stack is inserted.

With respect the limit 3, to distinguish address information saved in a stack area, an operation of recording additional information is performed. For example, a method of saving a set of data of a specific form (magic code) and address information of an instruction code on a stack area, a method of generating pointer information indicative of a save position of the address information, or the like may be used. The latter method will be described later with reference to FIGS. 6 to 8.

4. Instruction Code Translating Process

In the following step, the intermediate representation code 63 subjected to the optimizing process and the execution context state control process 64 is converted to an instruction code for the core 1 (the application process code 51 for the core 1) by an instruction code translating process 65 for the core 1 and is converted to an instruction code for the core 2 (the application process code 52 for the core 2) by an instruction code translating process 66 for the core 2 (step S120). The instruction code translating processes 65 and 66 are executed using a basic block as a unit.

Since the execution context state control process 64 is executed in advance, the instruction code translating processes 65 and 66 generate instruction codes according to a common rule. Concretely, the contents of data assigned to the register set 1 (22) at the head of each of basic blocks of the application process code 51 for the core 1 and the contents of data assigned to the register set 2 (32) at the head of a corresponding basic block in the application process code 52 for the core 2 are matched. Further, the contents of data assigned so as to be saved in the stack area (55) for the core 1 at the head of each of basic blocks of the application process code 51 for the core 1 and the contents of data assigned so as to be saved in the stack area (56) for the core 2 at the head of a corresponding basic block in the application process code 52 for the core 2 are matched.

5. Link Process/Generation of Instruction Address Conversion Table

Next, by a link process 67, an instruction code for the core 1, an instruction code for the core 2, and data are placed in the address space of the memory 50 (step S125). At this time, the compiler 60 also generates the instruction address conversion table 54 in which the address correspondence relation between the instruction code for the core 1 after address allocation (the application process code 51 for the core 1) and the instruction code for the core 2 after address allocation (the application process code 52 for the core 2) is recorded (step S130).

Concrete Example of Instruction Address Conversion Table

Hereinafter, a concrete example of the instruction address conversion table 54 of FIG. 2 will be described.

Figure 4:
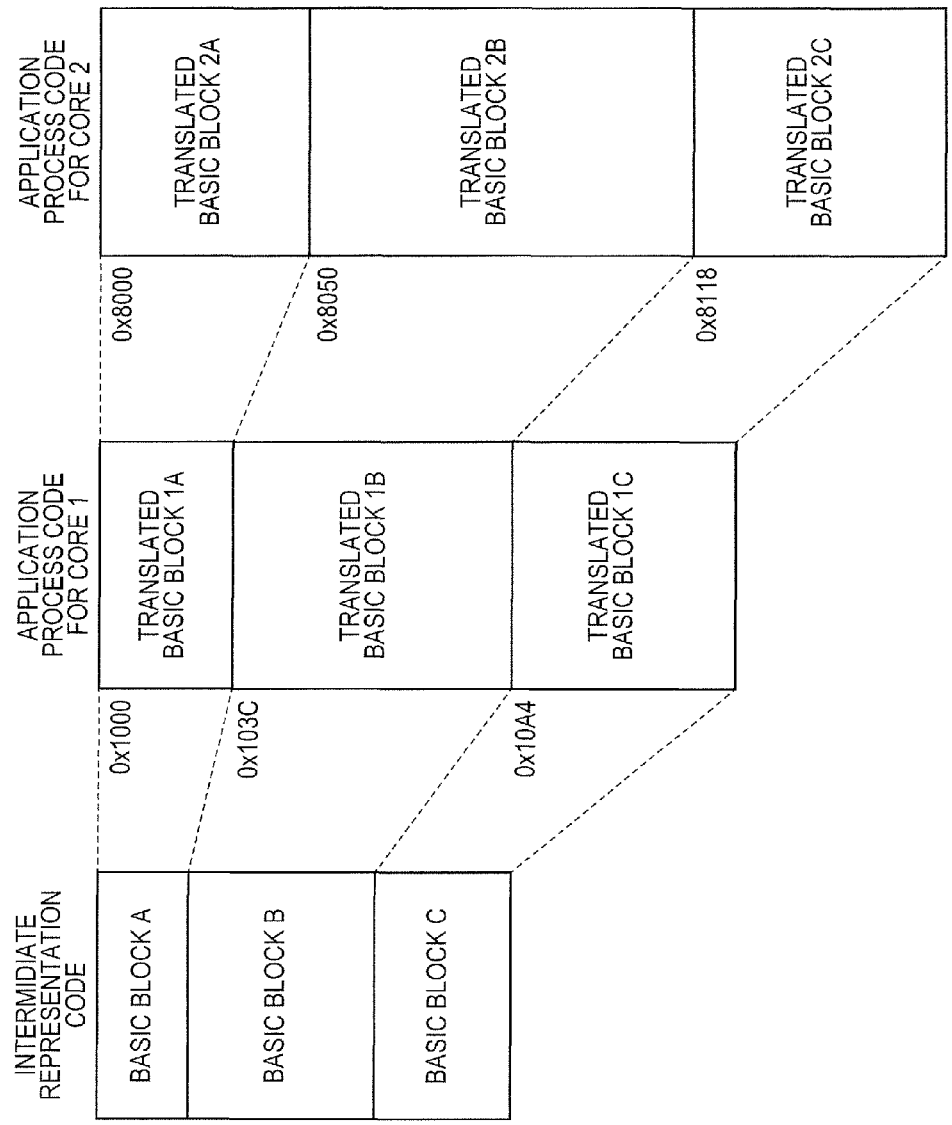
FIG. 4 is a diagram illustrating a corresponding relation of an intermediate representation code and an application process code for each of cores.

FIG. 4 is a diagram illustrating a corresponding relation of an intermediate representation code and an application process code for each of cores. Referring to FIGS. 2 and 4, the intermediate representation code 63 is divided into basic blocks using, as a unit, a successive instruction string until a branch instruction. For example, in the example of FIG. 4, the intermediate representation code 63 is divided into basic blocks A, B, and C.

The compiler 60 translates the intermediate representation code 63 to instruction codes for the cores in the instruction code translating processes 65 and 66 on the basic block unit basis. For example, in the example of FIG. 4, the process content corresponding to the basic block A of the intermediate representation code 63 is a translated basic block 1A in the case where the intermediate representation code 63 is translated to an instruction code for the core 1, and is a translated basic block 2A in the case where the intermediate representation code 63 is translated to an instruction code for the core 2. Similarly, a basic block B of the intermediate representation code corresponds to a translated basic block 1B and a translated basic block 2B, and a basic block C of the intermediate representation code corresponds to a translated basic block 1C and a translated basic block 2C.

The translated basic blocks 1A to 1C and 2A to 2C are assigned to the addresses spaces by the link process 67. At this time, a set of the head addresses of the corresponding translated basic blocks is recorded in the instruction address conversion table 54.

FIG. 5 is a diagram for explaining address information recorded in the instruction address conversion table in the example of FIG. 4. Referring to FIGS. 4 and 5, a set of the head address 0x1000 of the translated basic block 1A for the core 1 and the head address 0-8000 of the corresponding translated basic block 2A for the core 2 is recorded in the instruction address conversion table 54. A similar operation is performed with respect to the basic blocks B and C.

The instruction code of each of the application processes is assigned to an area assigned to each of the cores. Data is assigned to an area common to the cores and can be referred to by the same address from each of the cores.

Concrete Example of Limit 3 of Execution Context State Control Process

Hereinafter, as a concrete example of the limit 3 of the execution context state control process 64, a method of separately generating pointer information expressing a save position of address information will be described.

FIG. 6 is a diagram illustrating a sample code. In the sample code of FIG. 6, an example of sequentially executing a process 1, a process 3, and a process 2, which are simple and have no branch is shown.

Figure 7:
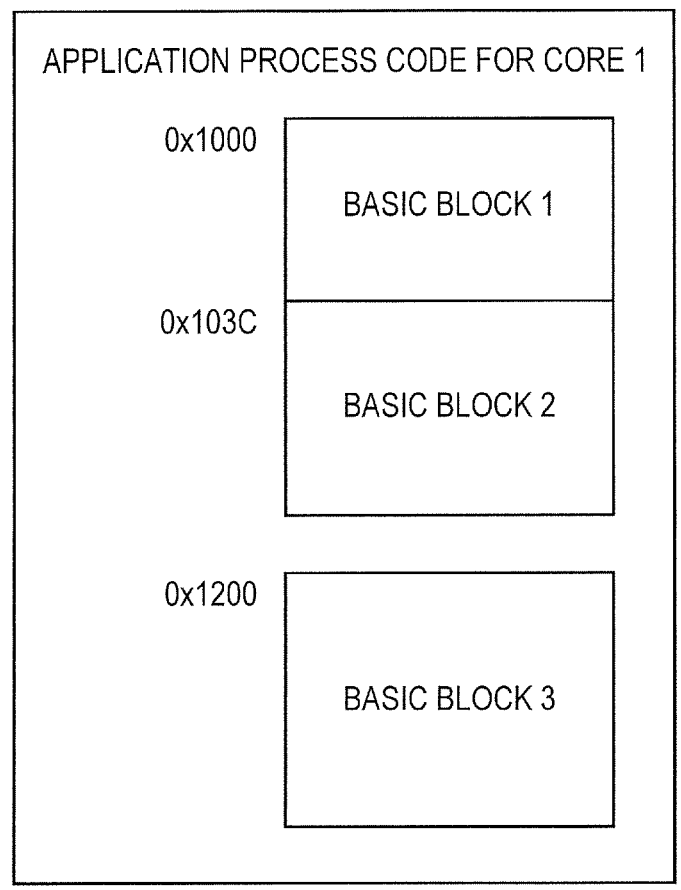
FIG. 7 is a diagram illustrating a configuration example of basic blocks of the application process codes for a core 1 corresponding to the sample code of FIG. 6.

FIG. 7 is a diagram illustrating a configuration example of basic blocks of the application process codes for the core 1 corresponding to the sample code of FIG. 6.

Referring to FIGS. 6 and 7, a basic block is divided using a branch instruction as a border, so that a function func_main is divided into different basic blocks by calling of a function func_a. The first half is called a basic block 1 and the latter half is called a basic block 2. The function func_a becomes a single basic block 3. The final instruction of the basic block 1 is a branch instruction which jumps to the basic block 3. The final instruction of the basic block 3 is a branch instruction which returns to the head of the basic block 2. The execution order of processes is the process 1 (basic block 1), the process 3 (basic block 3), and the process 2 (basic block 2). In the example, the register width is 16 bits, and all of argument parameters for function call are passed via stacks.

Figure 8A:
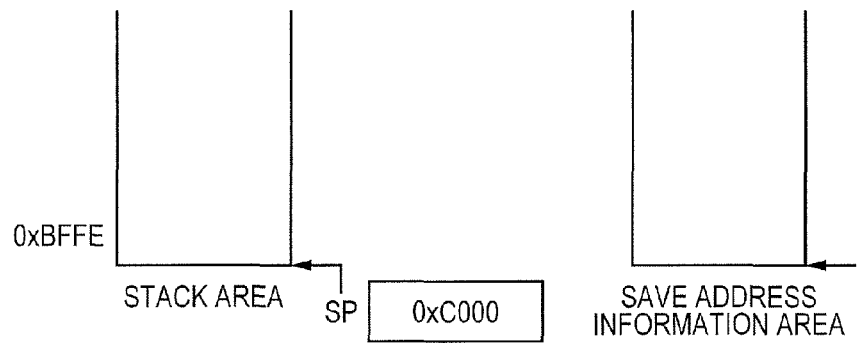
FIGS. 8A to 8C are diagrams illustrating the state of stacking when a process on the sample code of FIG. 6 is executed.
Figure 8B:
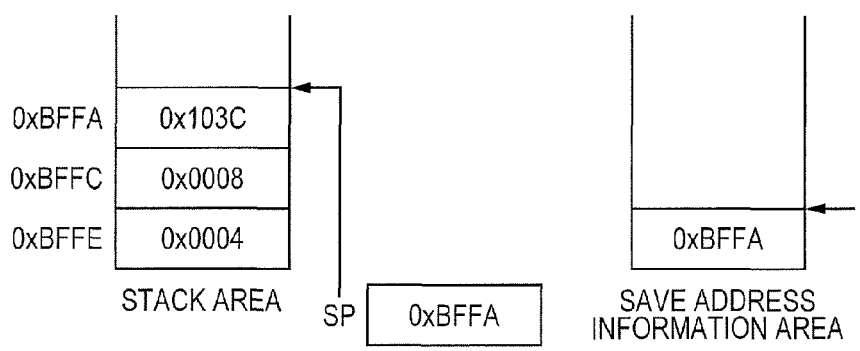
Figure 8C:
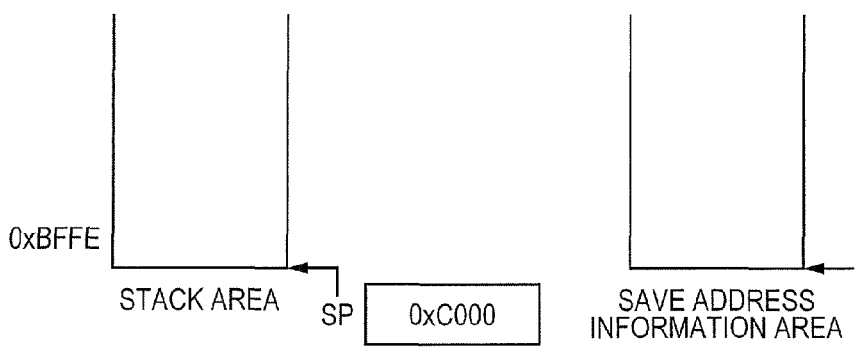

FIGS. 8A to 8C are diagrams illustrating the state of a stack when a process on the sample code of FIG. 6 is executed.

FIG. 8A illustrates a state of the head stack of the basic block 1. A stack pointer (SP) indicates the head of a stack area.

Referring to FIG. 8B, in the case of calling the function func_a, argument parameters (0x0004, 0x0008) are stacked in the stack area and, after that, the address of the instruction code as a return destination (the head address of the basic block 2: 0x103C) is stacked. This is a process performed at the end of the basic block 1 as a pre-process for calling the function func_a.

In addition to the process, the position information (address 0xBFFA) of the SP in which the address of the instruction code as a return destination is stored is stored in a save address information area which is provided in an area different from the stack area. The save address information area is also an area which expands like the stack area.

Therefore, at the head of the basic block 3 immediately after the branch to the function func_a, the stack state illustrated in FIG. 8B is obtained. The data in the address 0xBFFA is the address of the instruction code in the data saved in the stack area, and can be detected by scanning the save address information area.

Referring to FIG. 8C, at the end of the basic block 3, the return address (address 0xBFFA) is taken from the stack and the program returns to the address. At this time, the data stored in the save address information area is also discarded. As a result, at the head of the basic block 2, the stack state illustrated in FIG. 8C is obtained.

The operation on the save address information area is inserted by the execution context state control process 64 (step S115 in FIG. 3) and is automatically added into a basic block by the instruction code translating process 65 for the core 1 (step S120 in FIG. 3). The process of saving the return address to the stack and simultaneously saving the data at the SP also to the save address information area may be realized by hardware.

Execution Context Transfer Process

Next, the execution context transfer process 57 in FIG. 2 as a process of transferring the execution state of the core 1 (20) to the core 2 (30) and continuously executing the state will be described. The execution context transfer process 57 is started in the case where time constraint changes during execution of the application for the core 1, that is, in the case where a result has to be given in short time by the high-performance core 2 (30) (the case where high computing power is necessary).

For example, an image sensor provided as the peripheral device 40 in FIG. 1 will be described. In normal time when no image is supplied to the image sensor, the high computing power of the CPU is not necessary. On the other hand, in the case where an image is supplied to the image sensor and the image sensor reacts to it, the CPU has to perform image data analyzing process and output a result within predetermined time, and high computing power is required. In this case, in response to an interrupt notification from the image sensor, an interrupt handler process is executed in the core 1 (20). In response to a request from the interrupt handler process, the execution context transfer process 57 is executed in the core 1 (20) and the core 2 (30).

As another example, normally, it is sufficient to slowly perform a simple process of just storing input data into a buffer. At the time point when a predetermined amount of input data is stored in the buffer, a process of computing the data at once and outputting a result is performed. In this case, by a request from a process program which manages the buffer of the input data executed in the core 1 (20), the execution context transfer process 57 is executed in the core 1 (20) and the core 2 (30).

As further another example, the OS (Operating System) determines whether or not scheduling is possible in accordance with load information of a task started, and the execution context transfer process 57 is executed by a request from the OS.

Figure 9:
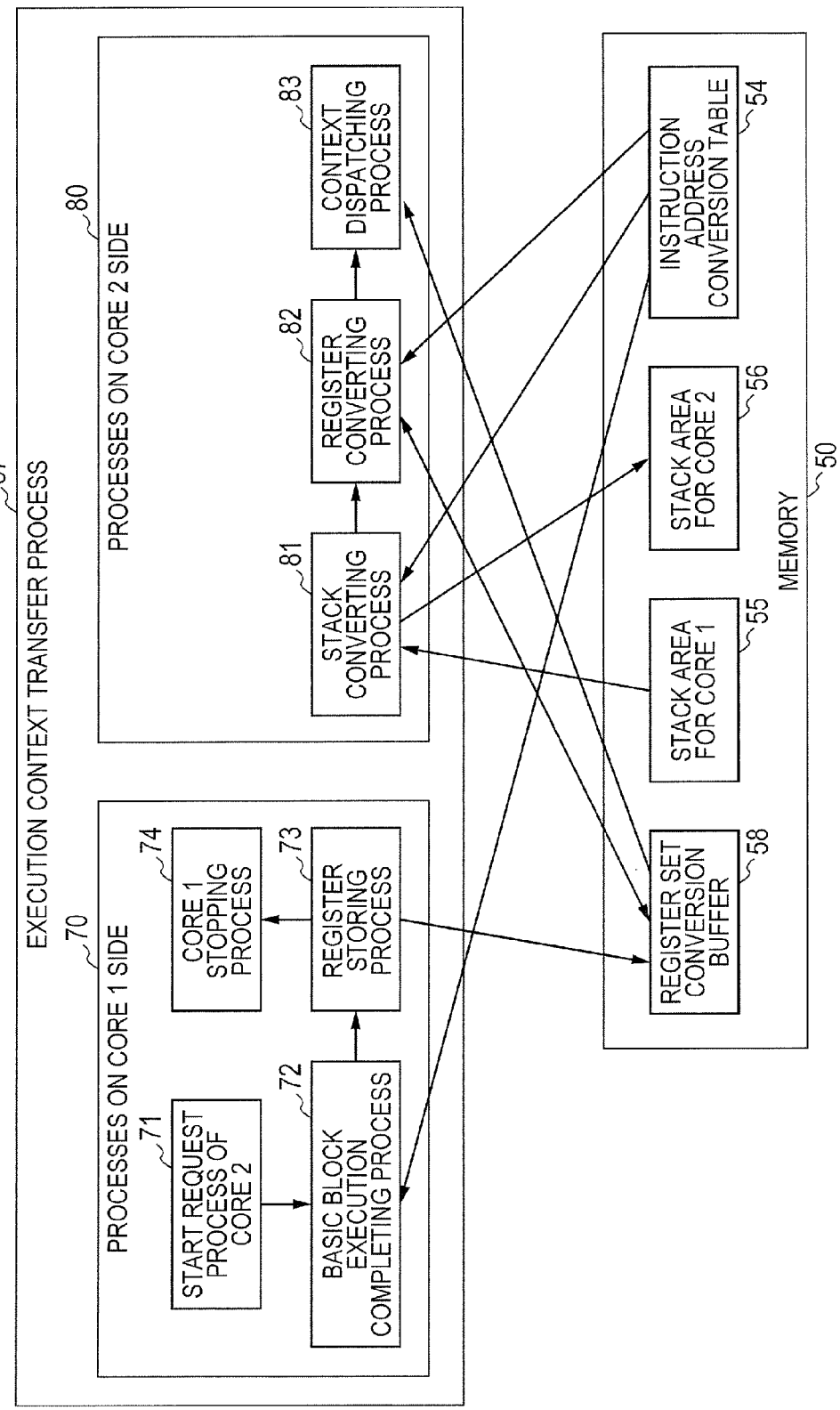
FIG. 9 is a diagram for explaining concrete process contents of an execution context transfer process.

FIG. 9 is a diagram for explaining concrete process contents of the execution context transfer process. FIG. 9 illustrates an example of determining a change in time constraint by a process code executed in the core 1 (20) and generating a request to switch the process from the core 1 (20) to the core 2 (30).

1. Processes on Core 1 Side

As illustrated in FIG. 9, in the execution context transfer process 57, functions are divided to the core 1 (20) and the core 2 (30). As processes 70 on the core 1 side, a core 2 start request process 71, a basic block execution completing process 72, a register storing process 73, and a core 1 stop process 74 are executed in order.

1-1. Core 2 Start Request Process

Referring to FIGS. 1 and 9, first, as the core 2 start request process 71, to start the core 2 (30) which is in a state where power supply is stopped, a request to supply power to the core 2 (30) is sent from the core 1 (20) to the power managing unit 10. The core 1 (20) executes the rest of the application process for the core 1.

1-2. Basic Block Execution Completing Process

When the core 2 (30) starts and enters an executable power state, the power managing unit 10 notifies the core 1 (20) of the fact that the core 2 (30) enters an executable state by an interrupt signal. The core 1 (20) which receives the interrupt notification performs the basic block execution completing process 72 as an interrupt process.

Figure 10:
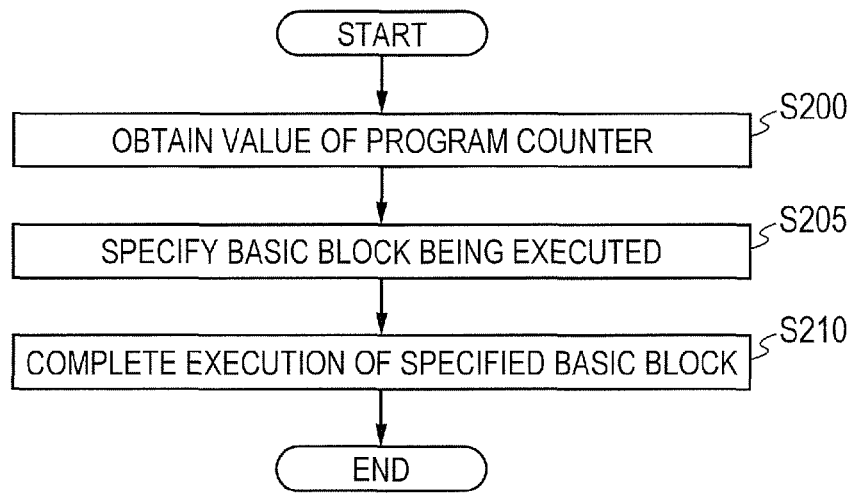
FIG. 10 is a flowchart illustrating steps of a basic block execution completing process in FIG. 9.

FIG. 10 is a flowchart illustrating steps of a basic block execution completing process in FIG. 9. Referring to FIGS. 9 and 10, first, the core 1 (20) obtains the value of the present program counter (PC) in the application process which is being executed (step S200).

Next, the core 1 (20) scans the instruction address conversion table 54 and specifies the basic block which is being executed at present (step S205). The time of search for the instruction address conversion table 54 can be reduced by providing a hash table.

Subsequently, the core 1 (20) performs processes until the branch instruction at the end of the specified basic block, thereby completing the processes of the basic block which is being executed at present and stopping the processes just before the instruction at the head of a basic block to be executed next (step S210). In the case where there is a debugging function such as a hardware break point or step instruction execution as the function of the core 1, by using it, the processes are performed just before the instruction at the head of a basic block to be executed next, and the processes can be stopped at the time point. The function can be also realized by setting a software break point in consideration of the branch destination address of the branch instruction.

When a request of supplying power to the core 2 (30) is sent to the power managing unit 10, without waiting for an interrupt notification from the power managing unit 10, the processes may be performed from the instruction indicated by the PC (Program Counter) of the present application process to the branch instruction at the end of the basic block being executed (until just before the instruction at the head of a basic block to be executed next). In this case, after executing the process until the branch instruction at the end of the basic block being executed at present, the core 1 (20) waits for an interruption notifying of the fact that the core 2 (30) enters the executable state.

1-3. Register Storing Process

Referring again to FIG. 9, next, the core 1 (20) executes the register storing process 73. Concretely, the core 1 (20) stores the data in the register just before execution of the instruction at the head of the next basic block by the application process code into the register set conversion buffer 58.

1-4. Core 1 Stopping Process

As the core 1 stopping process 74, the core 1 (20) requests start of execution (reset state cancellation) of the core 2 (30) and requests the power managing unit 10 to stop power supply to the core 1 (20) itself.

2. Processes on Core 2 Side

When the reset state of the core 2 (30) is cancelled, a minimum initializing process necessary to execution is performed and, after that, the execution context transfer process 57 on the core 2 side is started. As processes 80 on the core 2 side, a stack converting process 81, a register converting process 82, and a context dispatching process 83 are executed in order.

2-1. Stack Converting Process

Figure 11:
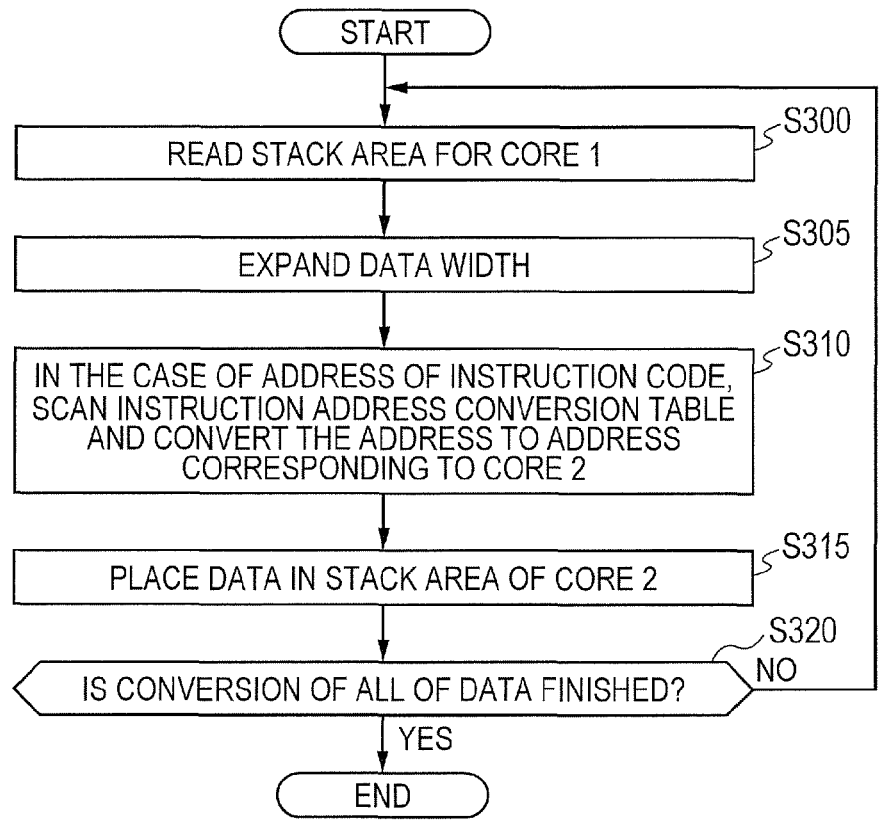
FIG. 11 is a flowchart illustrating steps of a stack converting process in FIG. 9.

FIG. 11 is a flowchart illustrating the steps of the stack converting process in FIG. 9.

Referring to FIGS. 9 and 11, in the stack converting process 81, the core 2 (30) reads data in the stack area 55 for the core 1 on the memory 50 (step S300), expands the data width (step S305), and relocates the data in the stack area 56 for the core 2 (step S315). At this time, in the case where the data read from the stack area 55 for the core 1 is the address of an instruction code such as a return value of a function call, the core 2 (30) scans the instruction address conversion table 54, replaces the address with the corresponding address of the instruction code of the core 2 (30) (step S310), and places the resultant data in the stack area 56 for the core 2 (step S315).

The above-described steps are repeated on all of the data stored in the stack area 55 for the core 1 (until "YES" is obtained in step S320). In FIG. 11, the order of executing the steps S305 and S310 may be opposite.

2-2. Register Converting Process

Figure 12:
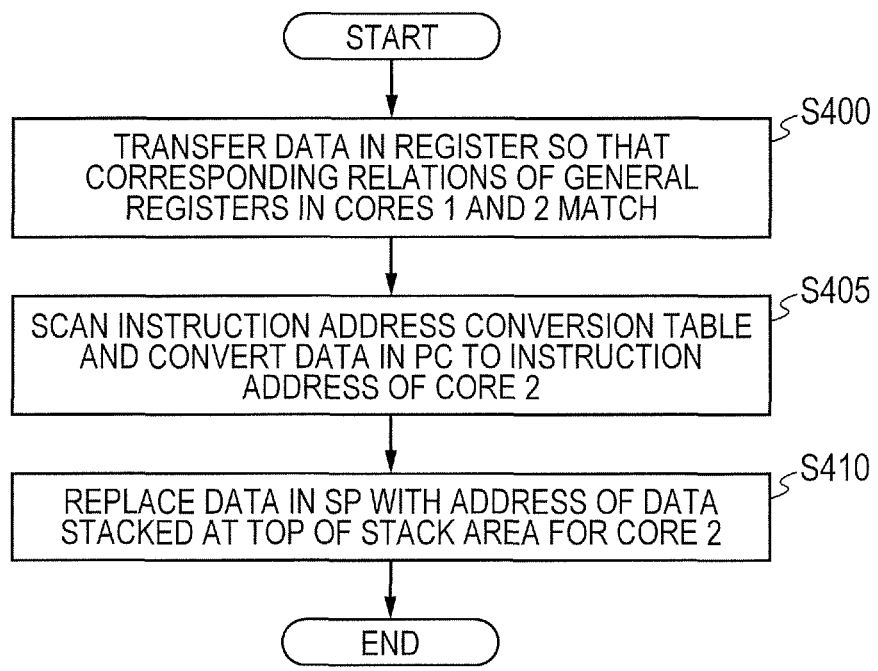
FIG. 12 is a flowchart illustrating steps of a register converting process in FIG. 9.

FIG. 12 is a flowchart illustrating steps of the register converting process in FIG. 9. Referring to FIGS. 9 and 12, in the register converting process 82, the core 2 (30) converts the data in the general register in the core 1 (20) stored in the register set conversion buffer 58 to the form of the general register in the core 2 (30).

Concretely, the core 2 (30) transfers the data in the register so that the corresponding relations of the general registers used for holding the data match in accordance with the constraint condition given in the execution context state control process 64 (step S400). Further, the core 2 (30) converts the data in the PC to the instruction code address of the core 2 (30) obtained by scanning the instruction address conversion table 54 (step S405). The core 2 (30) replaces the data in the SP to the address of data generated by the stack converting process 81 and stacked at the top of the stack area 56 for the core 2 (step S410). As the order of executing the steps S400, S405, and S410, any step may be executed first.

2-3. Context Dispatching Process

In the context dispatching process 83, the core 2 (30) sets the data in the general register generated in the register set conversion buffer 58 by the register converting process 82 to the register set 32 in the core 2 (30). Consequently, the continuation of the process interrupted in the core 1 (20) can be restarted in the core 2 (30).

The core 2 (30) starts execution of the application process code 52 for the core 2 from the instruction at the head of the basic block to be executed next to the basic block being executed at present in accordance with the value of the program counter (PC) included in the register set 32 for the core 2.

Example of Application to Sensor System

As an example of a system to which the asymmetric multicore CPU device 1 is applied, there is a sensor system which continuously operates for a long period on a battery. Hereinafter, the operation of the sensor system will be described.

Figure 13:
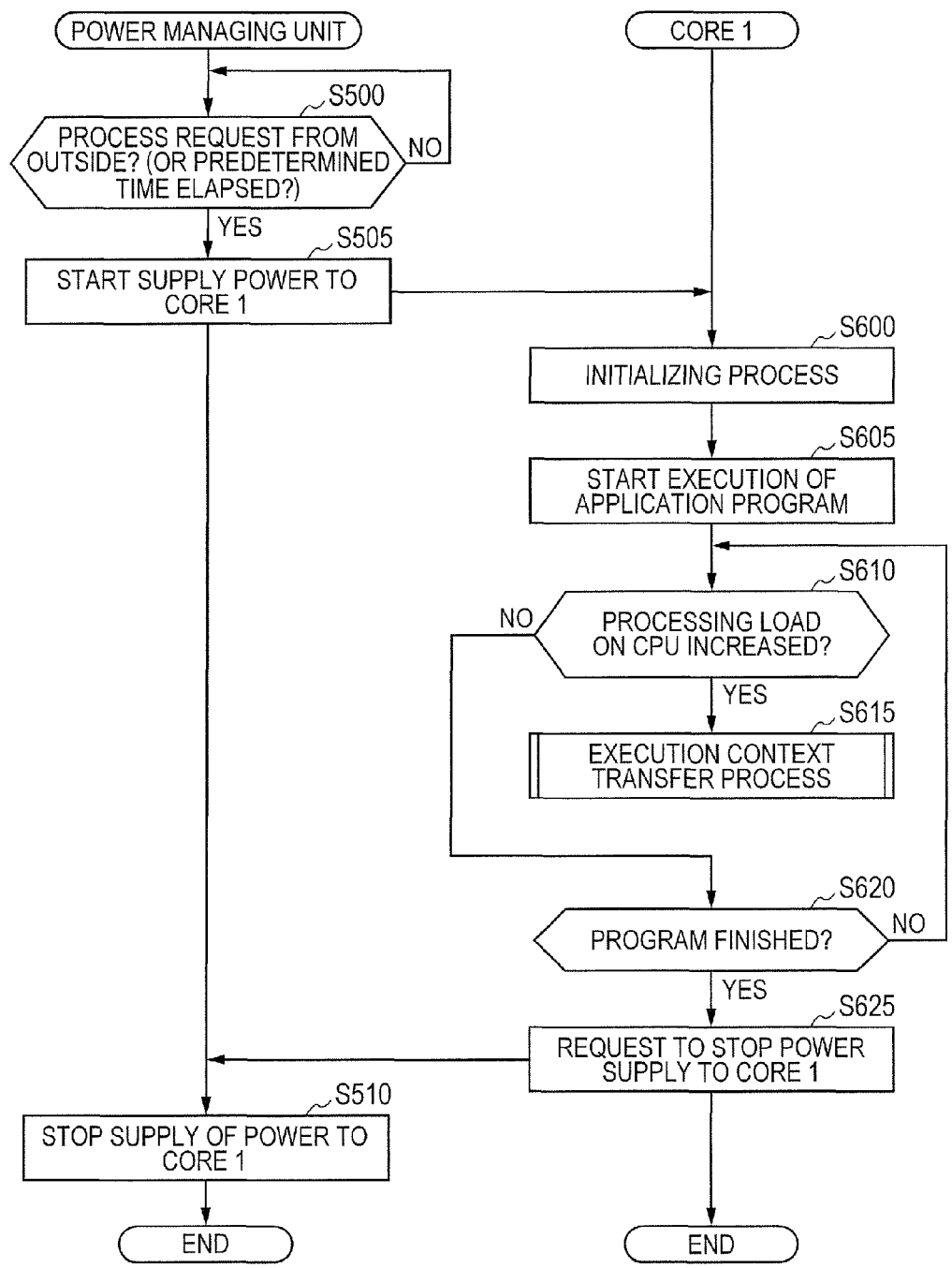
FIG. 13 is a flowchart illustrating an operation example of a sensor system.

FIG. 13 is a flowchart illustrating an operation example of the sensor system. Referring to FIGS. 1 and 13, in the sensor system, the CPUs (both of the core 1 (20) and the core 2 (30)) are in a standby state and stopped in normal time by an intermittent operation. Periodically or by a request from the outside (YES in step S500), the power managing unit 10 starts supply of power to the core 1 (20). The start point from the standby state is always the core 1 (20).

When the power is supplied from the power managing unit 10, the core 1 (20) executes the initializing process (step S600) and, after that, starts execution of the application program (step S605). When the processing load of the CPU does not increase (NO in step S610), the core 1 (20) executes a process until the end of the application program (until YES is obtained in step S620). After that, the core 1 (20) requests the power managing unit 10 to stop the power supply to the core 1 (20), and the power managing unit 10 stops the power supply to the core 1 (20), thereby returning to the standby state.

On the other hand, in the case where the processing load of the CPU increases during execution of the application program (YES in step S610), the process of the core 1 (20) shifts to the execution context transfer process 57 descried with reference to FIG. 9 (step S615). As the case where the processing load of the CPU increases, for example, there is a case where a predetermined amount of sensed input data is stored in the buffer, computation is performed by using the stored data, and a computation result is output via a communication line.

Figure 14:
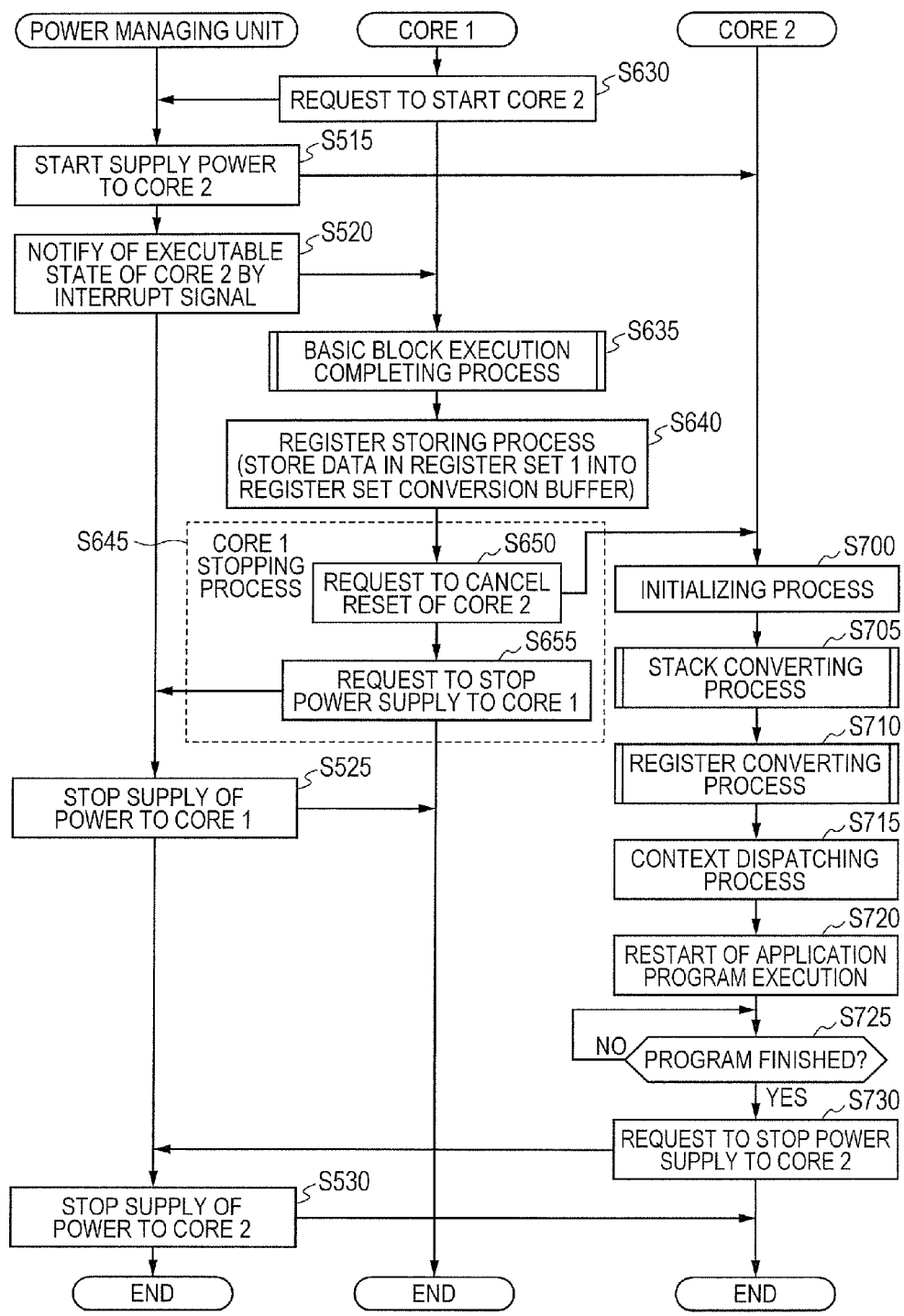
FIG. 14 is a flowchart illustrating steps of an execution context transferring process (step S615) in FIG. 13.

FIG. 14 is a flowchart illustrating steps of the execution context transferring process (step S615) in FIG. 13.

Referring to FIGS. 1, 9, and 14, in the execution context transfer process, the core 1 (20) requests the power managing unit 10 to start the core 2 (30) (step S630 and 71 in FIG. 9). On receipt of the request from the core 1 (20), the power managing unit 10 starts power supply to the core 2 (30) (step S515). When the power supply voltage supplied to the core 2 (30) reaches the voltage level at which the core 2 (30) can operate, the power managing unit 10 notifies the core 1 (20) of the fact that the core 2 (30) enters an executable state by an interrupt signal (step S520).

On receipt of the interrupt notification from the power managing unit 10, as described with reference to FIG. 10, the core 1 (20) performs the basic block execution completing process 72 (step S635) of completing execution of the basic block being executed at present and advancing the process to just before the head of the basic block being executed next. Further, the core 1 (20) executes the register storing process 73 (step S640) of storing the data in the register set 1 (22) into the register set conversion buffer 58.

After that, as described with reference to FIG. 9, the core 1 (20) executes the core 1 stopping process 74 (step S645). Concretely, the core 1 (20) requests cancellation of the reset state of the core 2 (30) (step S650) and requests the power managing unit 10 to stop power supply to the core 1 (20) itself (step S655). In response to the power stop request from the core 1 (20) (step S655), the power managing unit 10 stops power supply to the core 1 (20) (step S525).

When the reset state is cancelled, the core 2 (30) executes the initializing process (step S700). After that, as described with reference to FIG. 11, the core 2 (30) executes the stack converting process 81 of reading the data in the stack area 55 for the core 1 on the memory 50, converting the data to data for the core itself, and placing the resultant data in the stack area 56 for the core 2 (step S705).

Subsequently, as described with reference to FIG. 12, the core 2 (30) performs the register converting process 82 of converting data in the general register in the core 1 (20) stored in the register set conversion buffer 58 to the format of the general register in the core 2 (30) (step S710). Further, the core 2 (30) executes the context dispatching process 83 of setting the data in the general register generated in the register set conversion buffer 58 by the register converting process 82 into the register set 32 in the core 2 (30) (step S715).

After that, the core 2 (30) restarts execution of the application program from a basic block to be executed next to the basic block whose execution is finished in the core 1 (20) (step S720). The core 2 (30) continues the process until the application program is finished.

After completion of the application program (YES in step S725), the core 2 (30) requests the power managing unit 10 to stop the power supply to the core 2 (30) itself (step S730). In response to the power stop request from the core 2 (30), the power managing unit 10 stops the power supply to the core 2 (30) (step S530). By the operation, the asymmetric multicore CPU device 1 shifts again to the standby state.

As described above, after the process shifts from the core 1 (20) to the core 2 (30), it is not transferred from the core 2 (30) to the core 1 (20). The reason is that since there is overhead in energy and process performance to start the core 2 (30), it is desirable to perform all of the remaining processes after the process is shifted to the core 2 (30) and to shift to the standby state as quickly as possible. The start point from the standby state is always the core 1 (20).

With the above-described system configuration, by executing the simple operation which does not require high processing power in the intermittent operation by the high-every-efficiency low-performance core 1 (20), the energy consumption amount at the time of the stationary operation can be suppressed. As a result, the continuous operation for a long period can be realized in a device driven on a battery. On the other hand, in the case where the calculation performance is temporarily necessary such as a data analyzing process or a communication process, by switching the core 1 to the high-performance core 2 (30) and handing over the process, the real-time performance can be satisfied. With the configuration, at the time of designing or mounting a system, it becomes unnecessary to preliminarily determine a core which executes a process. In the case where time constraint or energy constraint changes at the time of operation of the system, a system which dynamically scheduling a core performing a process in accordance with the change can be realized.

Effect of the Embodiment

As described above, according to the embodiment, by switching the application process between the asymmetric cores having no compatibility in ISA, continuous execution is realized. Since compatibility of the ISA and the register set is unnecessary, for example, a combination of the low-power-oriented core whose register width is 16 bits and the high-performance-oriented core whose register width is 32 bits can be realized. By suppressing the register width of the low-power-oriented core to 16 bits, the area of the core and the number of transistors are reduced. Consequently, the difference of the performances or power efficiencies can be assured more largely. Further, since the application process is not fixed to a core but can be executed transparently, preliminary designing on the process performance and power is unnecessary, and cores to which a process is assigned can be flexibly switched in accordance with an occurrence state of an external factor at the time of execution.

It is to be noted that the embodiment disclosed this time is illustrative and not restrictive in all respects. The scope of the present invention is defined by the scope of claims rather than the above description and all changes that fall within the meaning and range of equivalency of the claims are therefore intended to be embraced therein.

What is claimed is:

1. An information processing device comprising:
   a first processor core;
   a second processor core;
   a controller configured to control power supply to the first processor core and the second processor core; and
   a memory coupled to the first and second processor cores,
   wherein the memory stores:
   first and second execution codes obtained by compiling an application program for execution in each of the first and second processor cores, respectively; and
   a table showing a corresponding relation between an address of each of basic blocks of the first execution code on the memory and an address of each of basic blocks of the second execution code on the memory; and
   a switch process code which operates when a request of switching an execution subject is generated during a period in which the first processor core executes the application program,
   wherein, in response to receiving a request from the first processor core to start the second core, the controller is configured to execute the switch processes code to:
   start supplying power to the second processor core; and
   send an interrupt signal to notify the first processor code that the second processor core is at an operable voltage level,
   wherein, in response to receiving the interrupt signal from the controller, the first processor core is configured to specify a basic block which is being executed at present on the basis of the table, continue execution of the first execution code until a branch instruction at the end of the specified basic block, and request the controller to stop power supply to the first processor core after reaching a head of a basic block to be executed next to the specified basic block, and
   the second processor core is configured to execute the second execution code from an instruction at the head of the basic block to be executed next to the specified basic block.

2. The information processing device according to claim 1,
   wherein the first processor core has a first register set,
   wherein the second processor core has a second register set,
   wherein the memory includes:
   a first stack area allocated for the first processor core; and
   a second stack area allocated for the second processor core,
   wherein the contents of data allocated to the first register set at the head of each of basic blocks of the first execution code match the contents of data allocated to the second register set at the head of a corresponding basic block of the second execution code, and
   wherein the contents of data allocated so as to be saved in the first stack area at the head of each of basic blocks of the first execution code match the contents of data allocated so as to be saved in the second stack area at the head of a corresponding basic block in the second execution code.

3. The information processing device according to claim 2,
   wherein the memory further includes a buffer area, and
   wherein the switch process code is configured to store data stored in the first register set into the buffer area by the first processor core after completion of execution of the specified basic block,
   wherein the switch process code is configured to convert data stored in the first stack area to data for execution in the second processor core by the second processor core and store the resultant data into the second stack area after completion of execution of the specified basic block, and
   wherein the switch process code is configured to convert data stored in the buffer area to data for execution in the second processor core by the second processor core and store the resultant data into the second register set.

4. The information processing device according to claim 3, wherein the controller comprises a power managing unit capable of supplying power supply voltage individually to each of the first and second processor cores,
   wherein the power managing unit supplies power supply voltage to the first processor core but does not supply the power supply voltage to the second processor core when the first processor core starts execution of the application program, and
   wherein, after the switch request is generated, the power managing unit starts supplying power supply voltage to the second processor core.

5. The information processing device according to claim 4, wherein the switch process code is configured so that, after the interrupt signal is sent from the power managing unit to the first processor core and the data stored in the first register set is stored in the buffer area, the request to stop power supply to the first processor core is sent to the controller.

6. The information processing device according to claim 3,
   wherein the switch process code is configured to convert the value of a program counter of the first processor core stored in the buffer area to a value of a program counter for the second processor core by the second processor core on the basis of the corresponding relation of the addresses shown in the table, and
   wherein the switch process code is configured to convert the value of the address stored in the first stack area to the value of the address for the second processor core by the second processor core on the basis of the corresponding relation of the addresses stored in the table.

7. The information processing device according to claim 1, wherein the first processor core operates at a frequency lower than that of the second processor core.

8. The information processing device according to claim 1, wherein an instruction set of the first processor core and that of the second processor core do not have compatibility.

9. An information processing method using a multicore processor comprising a first processor core, a second processor core, controller and a memory coupled to the first and second processor cores, the method comprising:
- generating first and second execution codes by compiling an application program for execution in each of the first and second processor cores, respectively;
- generating a table showing a corresponding relation between an address of each of basic blocks of the first execution code on the memory and an address of each of basic blocks of the second execution code on the memory;
- sending, by the first processor core, a request to start the second core;
- in response to receiving a request from the first processor core, supplying, by the controller, power to the second processor core; and sending, by the controller, an interrupt signal to notify the first processor code that the second processor core is at an operable voltage level;
- in response to receiving the interrupt signal from the controller, specifying, by the first processor core, a basic block which is being executed at present on the basis of the table; executing, by the first processor core, the first execution code until a branch instruction at the end of the specified basic block; and requesting the controller to stop power supply to the first processor core in response to reaching a head of a basic block to be executed next to the specified basic block; and
- executing, by the second processor core, e the second execution code from an instruction at the head of the basic block to be executed next to the specified basic block.

* * * * *